United States Patent
Aiello et al.

(10) Patent No.: US 9,245,138 B2
(45) Date of Patent: Jan. 26, 2016

(54) SHARED PREFERENCES IN A MULTI-APPLICATION ENVIRONMENT

(71) Applicant: Google Inc., Mountain View, CA (US)

(72) Inventors: Michele Aiello, London (GB); Vinod Kumar Ramachandran, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 100 days.

(21) Appl. No.: 13/938,135

(22) Filed: Jul. 9, 2013

(65) Prior Publication Data

US 2015/0205968 A1    Jul. 23, 2015

(51) Int. Cl.
*G06F 21/12*  (2013.01)
*G06F 21/62*  (2013.01)
*G06F 12/14*  (2006.01)

(52) U.S. Cl.
CPC ............ *G06F 21/62* (2013.01); *G06F 12/1408* (2013.01)

(58) Field of Classification Search
CPC .............................. G06F 12/1408; G06F 21/62
USPC .......................................................... 713/193
See application file for complete search history.

(56) References Cited

U.S. PATENT DOCUMENTS

| | | | |
|---|---|---|---|
| 7,024,581 B1 * | 4/2006 | Wang ................... | G06F 11/1417 713/2 |
| 7,313,823 B2 * | 12/2007 | Gao ................................ | 726/26 |
| 2002/0069363 A1 * | 6/2002 | Winburn ....................... | 713/200 |
| 2007/0220068 A1 * | 9/2007 | Thompson et al. ........... | 707/203 |
| 2008/0086513 A1 * | 4/2008 | O'Brien ........................ | 707/200 |
| 2012/0210398 A1 * | 8/2012 | Triantafillos ........ | G06F 11/1458 726/4 |
| 2013/0067578 A1 * | 3/2013 | Dool ..................... | G06F 21/565 726/24 |

* cited by examiner

*Primary Examiner* — Izunna Okeke
*Assistant Examiner* — Ali Shayanfar
(74) *Attorney, Agent, or Firm* — McDermott Will & Emery LLP (57) ABSTRACT

Various aspects of the subject technology relate to a system configured to store preferences in a file that is accessible to other applications on a computing device. The preferences stored in the file may include application use preferences that specify an application to be launched and the conditions in which the application is to be launched. The system further includes features for protecting the preferences in the file from modification by unauthorized parties or applications.

13 Claims, 6 Drawing Sheets

FIG. 1

Preferences

| CONDITION | APPLICATION |
|---|---|
| URI beings with "mailto:" | xMail App |
| URI begins with "www.vidtube.com" | VidTube App |
| URI ends with ".avi" | VidTube App |
| URI ends with ".mp3" | MusicPlayer |
| URI beings with "callto:" | MyPhone App |
| URI beings with "feed:" | WebSubReader App |
| URI beings with "maps:" | Navigator |
| URI beings with "http:" | c-Browser Plus |
| .mp3 file | MusicPlayer |
| .avi file | MediaCenter |
| .doc file | WorkSuite |
| .pdf file | WorkSuite |
| User selection of a Phone Number | MyPhone App |
| User selection of an Email Address | xMail App |
| User selection of an Address | Navigator |
| . . . | . . . |

SHARED PREFERENCES IN A MULTI-APPLICATION ENVIRONMENT

BACKGROUND

The present disclosure generally relates to user preferences and, in particular, to setting and sharing user preferences in multi-application environments.

Many operating systems for computing devices enable multiple applications to run on the computing device. Each operating system may be configured to determine what application is to be launched or otherwise used to load content, run a file, or execute a command or instruction. In some cases, the operating system does not allow an application running on the computing device to alter the applications that are to be launched for specific circumstances. Accordingly, a user of the computing device is not able to change which application is used to load particular content. In other cases, the operating system does allow applications to alter the settings. However, some applications may maliciously alter the applications that are to be used without user consent.

SUMMARY

Various aspects of the subject technology relate to a system for restoring preferences stored in a file. The system includes one or more processors and a machine-readable medium comprising instructions stored therein, which when executed by the one or more processors, cause the one or more processors to perform operations. The operations include comparing a public file comprising preferences for using applications in a multiple-application environment with a private file comprising preferences for using applications in the multiple-application environment. The public file is accessible to a plurality of applications in the multiple-application environment and the private file is accessible to a single application in the multiple-application environment. The operations also include determining whether there is an unauthorized modification of the preferences stored in the public file based on the comparing and undoing, if there is an unauthorized modification, the unauthorized modification of the preferences stored in the public file using the preferences of the private file.

Other aspects of the subject technology relate to a method for restoring preferences stored in a file. The method includes comparing a public file comprising preferences for using applications in a multiple-application environment with a private file comprising preferences for using applications in the multiple-application environment. The public file is accessible to a plurality of applications in the multiple-application environment and the private file is accessible to a single application in the multiple-application environment. The method also includes determining whether there is an unauthorized modification to the preferences of the public file based on the comparing and restoring, if there is an unauthorized modification, the preferences of the public file using the preferences of the private file.

Various aspects of the subject technology relate to a non-transitory machine-readable medium comprising instructions stored therein, which when executed by a machine, cause the machine to perform operations for encrypting preferences stored in a file. The operations include receiving preferences for using applications in a multiple-application environment, encrypting the preferences using a private key provided to an application that is authorized to make changes to the preferences, and storing the encrypted preferences in a file accessible to at least one other application in the multiple-application environment, wherein the encrypted preferences are configured to be decrypted by the at least one other application using a public key corresponding to the private key.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Various aspects of the subject technology relate to methods and systems for storing preferences in a file that is accessible to other applications on the computing device. The preferences stored in the file may include application use preferences that specify an application to be launched and the conditions in which the application is to be launched. In some aspects, the methods and systems may further include means for protecting the preferences in the file from modification by unauthorized parties or applications.

An operating system running on a computing device may allow for a number of applications to run on the computing device. These applications may be configured to launch under certain conditions. In some cases, more than one application on the computing device may be capable of executing under the same conditions. For example, the computing device may have multiple web browsers that can be launched in response to receiving a selection of a particular uniform resource locator (URL). In another example, both a web browser and a media player (e.g., a video or music player) may be launched in response to receiving a selection of a URL specifying the location of media content.

Some operating systems store application use preferences (e.g., information about what applications are to be launched and under which conditions the applications are to be launched) in an operating system file that cannot be modified by other applications or by the user. Accordingly, the operating system does not provide a way for a user to change which application is used under a particular set of conditions.

According to various aspects of the subject technology, a system may be configured to store application use preferences in a file that is separate from the operating system file and is accessible to other applications on the computing device. A user of one of the applications that has access to the file (e.g., a web browser) may use the file to determine what application is to be launched based on a given set of conditions. A user may also use an authorized application to modify the preferences stored in the file and change the applications that are configured to launch and the conditions the applications are to launch.

Some applications or other malicious code may be configured alter the preferences in the file without the user's consent. Accordingly, various aspects of the subject technology may also provide security features that prevent unauthorized changes to the preferences in the file or undo any unauthorized changes to the preferences in the file.

Figure 1:
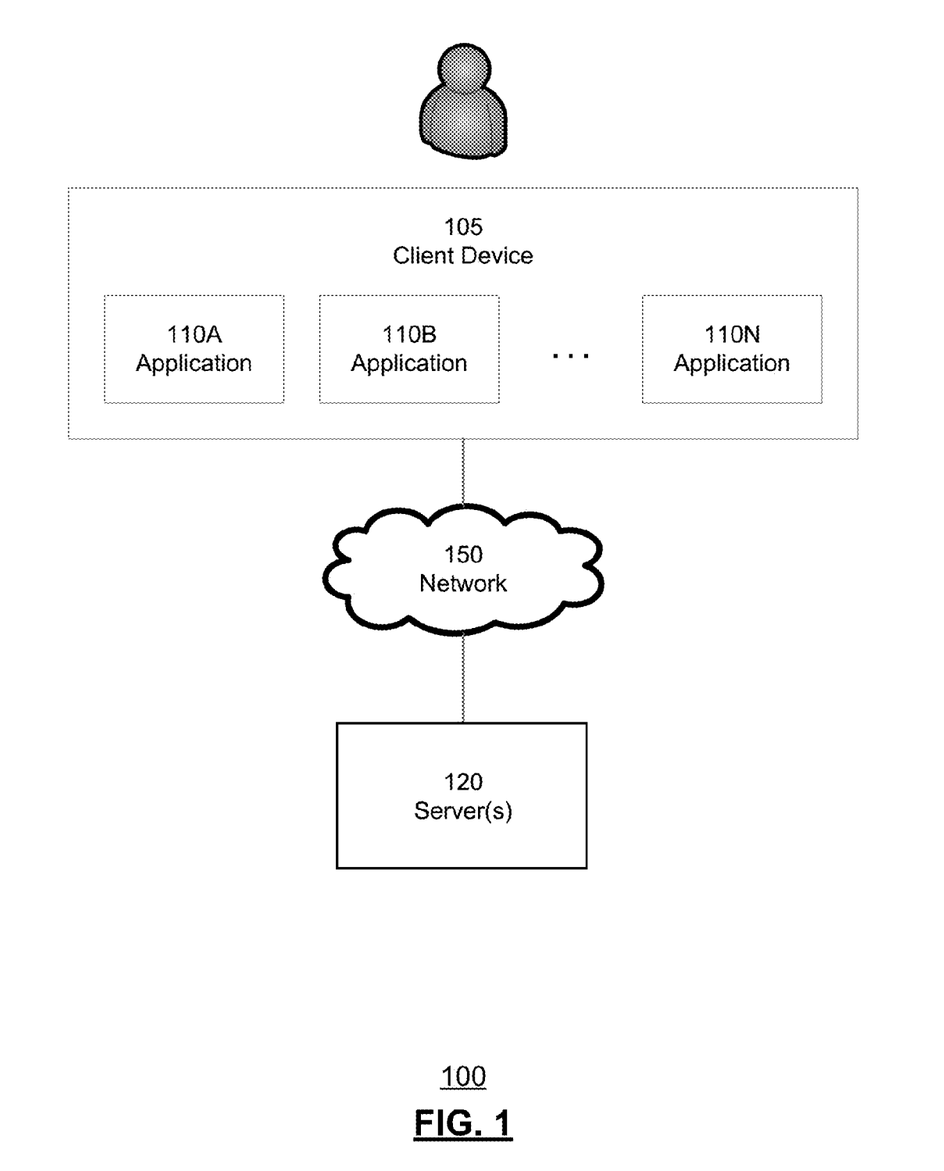
FIG. 1 is a block diagram illustrating an example environment in which a system to store application use preferences may exist, in accordance with various aspects of the subject technology.

FIG. 1 is a block diagram illustrating an example environment in which a system to store application use preferences may exist, in accordance with various aspects of the subject technology. The network environment includes a client device 105, one or more servers 120 connected via a network 150 (e.g., the Internet). In other aspects, however, the system may exist in other types of environments such as a single system environment without the servers 120.

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client device 105 can be any machine able to run multiple applications and store user preferences in a file. The client device 105 may be, for example, a mobile device (e.g., smart phones, tablets, personal digital assistants (PDAs), smart displays, navigation devices, etc.), a smart television, a laptop, a computer, a set top box, a gaming console, etc. The client device 105 may also include a number of applications 110A-110N which may include, for example, web browsers or dedicated programs (e.g., an "app" for a mobile device) configured to execute instructions. The applications 110A-110N may also be configured to launch other applications to execute the instructions. For example, a web browser may launch a video player or other application to execute instructions for loading video content.

The instructions may include retrieving content stored locally or on one or more of the servers 120 over the network 150 and loading the content. Content may include, for example, web pages, images, video content, audio content, documents, advertisements, or any other digital content that can be transmitted over a network. For example, one or more of the applications 110A-110N may be configured to load video content stored locally or on a server 120. In other aspects, applications 110A-110N may be configured to execute instructions that include one or more commands. For example, one or more application 110A-110N on the client device 105 may be configured to launch and execute a uniform resource identifier (URI) command such as "mailto:BobG@email.com," which may cause the application to generate an email addressed to BobG@email.com.

An application, such as application 110A, can determine which application may also be configured to launch other applications to execute instructions by accessing a file that includes settings or preferences that identify conditions in which applications are to be launched, identifying a condition based on the instructions to be executed, launching the application corresponding to the identified condition, and providing the instructions to be executed to the launched application. The file that includes the settings or preferences may be stored on a memory at the client device 105 or on a server 120. Furthermore, the file may be associated with a user profile or account that belongs to the user of the client device 105.

Figure 2:
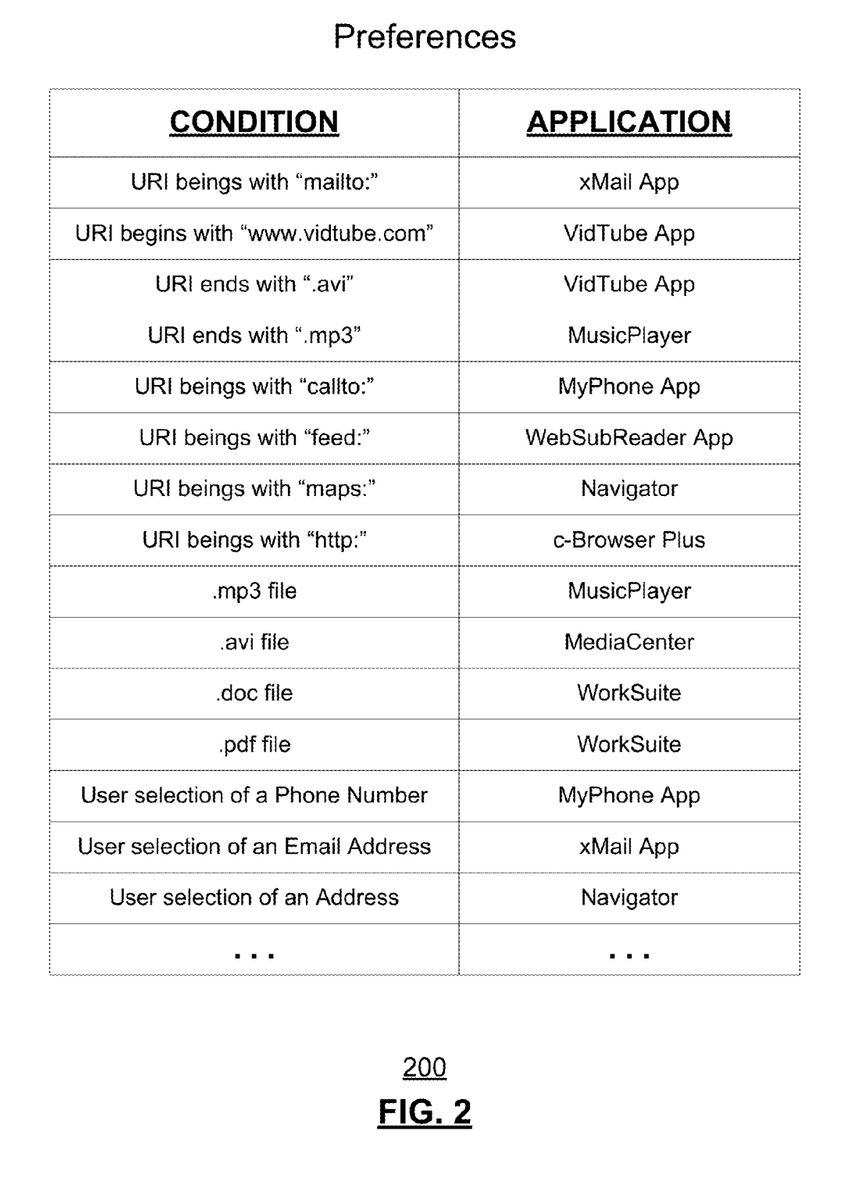
FIG. 2 is a conceptual representation of example contents of a file containing preferences for using applications on a client device, in accordance with various aspects of the subject technology.

FIG. 2 is a conceptual representation of example contents of a file containing preferences 200 for using applications on a client device, in accordance with various aspects of the subject technology. The preferences 200 may include entries that include a condition to be satisfied and an application to launch based on the satisfied condition. For example, one possible entry may specify that an "xMail App" application is to be launched if instructions to be executed include a URI that begins with the "mailto:" command. Other entries may specify that a "VidTube App" application is to be launched if instructions to be executed include a URL that begins with or includes a particular domain (e.g., "www.vidtube.com") or indicates that content to be loaded is of a particular type (e.g., a URI that ends with ".avi" indicates that content to be loaded is video content or an ".avi" file indicates that the content to be loaded is video content). Entries may also specify an application to be launched if, for example, a user selects content or text (e.g., a phone number, an email address, or an address) of a display.

The file containing the preferences 200 may be accessed by the applications 110A-110N of the client device 105 thus enabling the applications 110A-110N to determine which applications to launch based on conditions for the application. For example, an application, such as a web browser, may determine which application to launch under certain conditions by accessing the file containing the preferences 200 and identifying an entry in the preferences that has conditions that matches the conditions for the web browser, and launching the application corresponding to the identified entry.

One or more of the applications 110A-110N may also be configured to make changes to the preferences 200 by, for example, adding new entries, removing entries, altering entries, and/or changing the application to be launched under certain conditions. The changes to the preferences 200 may be made or authorized by a user of the computing device 105.

Figure 3:
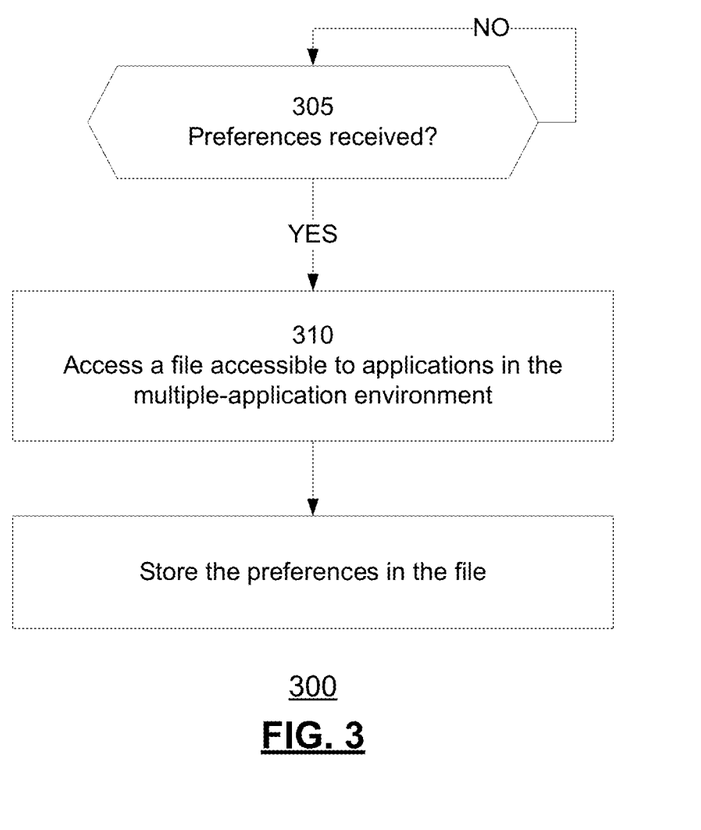
FIG. 3 is a flow chart illustrating an example process for modifying preferences stored in a file, in accordance with various aspects of the subject technology.

FIG. 3 is a flow chart illustrating an example process 300 for modifying preferences stored in a file, in accordance with various aspects of the subject technology. Although the blocks in FIG. 3 are shown in a particular order, other orderings are also possible. For example, some blocks may be performed in different orders or in parallel with other blocks.

At block 305, an application on the client device 105 may determine whether preferences for using applications in a multiple-application environment, such as the environment of the client device 105, have been received. The preferences may be received from a user via a user interface or from another source (e.g., another application or another device via the network 150). If no preferences have been received, the application may continue to wait for preferences. Once the preferences are received, the application may access a file accessible to the applications in the multiple-application environment at block 310 and, at block 315, store the preferences in the file.

Various aspects of the subject technology also provide security features configured to prevent unauthorized changes to the preferences in the file and/or undo unauthorized changes to the preferences. Such features may prevent application or other malicious code from altering the preferences in the file without the user's consent.

According to some aspects of the subject technology, in addition to the file storing the preferences that is accessible to multiple applications on the client device 105 (e.g., the "public" file), an application may store a private preferences file that can only be accessed by the application. The private file may include a copy of the preferences that have been authorized (e.g., by a user). In some implementations, the application that stores the private file may be the only application authorized to make changes to the preferences. When authorized changes to the preferences are received by the authorized applications, the authorized applications may be stored in both the public file and the private file. The private file may be used to determine if any unauthorized changes have been made to the public file storing the preferences and restore the public file to undo all of the unauthorized changes.

Figure 4:
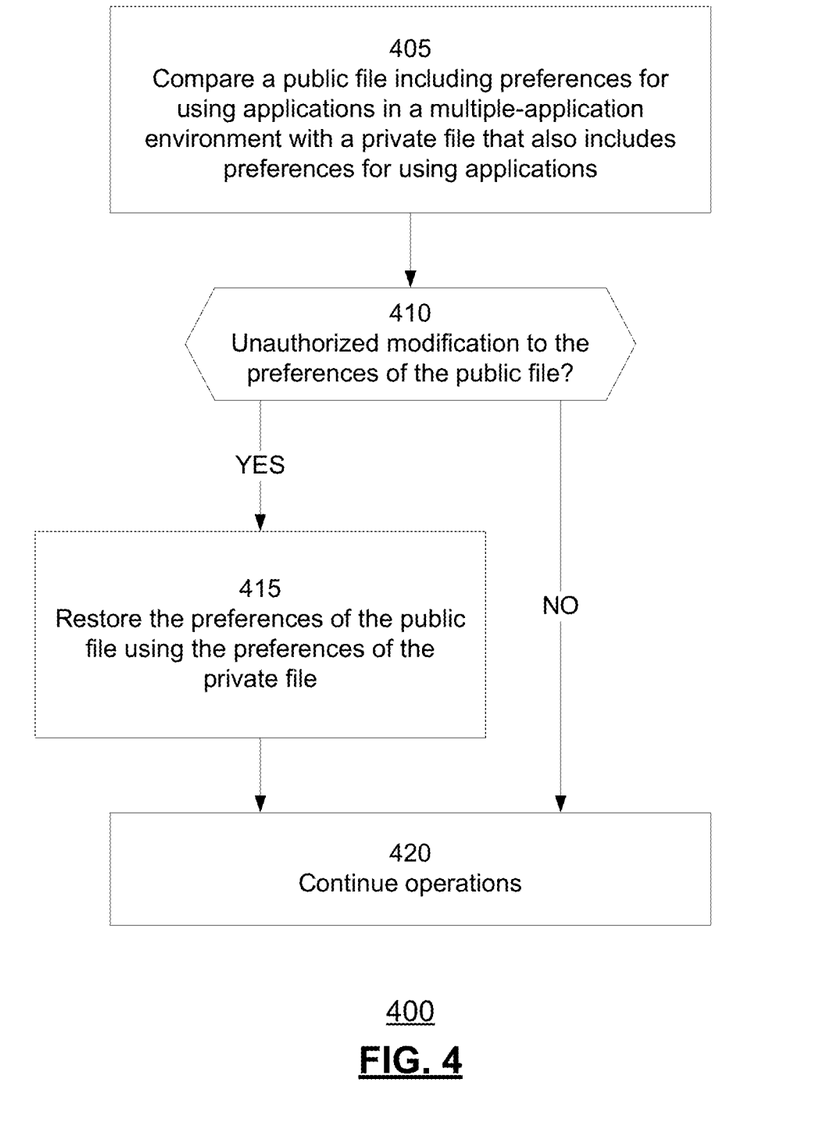
FIG. 4 is a flow chart illustrating an example process for restoring preferences stored in a file, in accordance with various aspects of the subject technology.

For example, FIG. 4 is a flow chart illustrating an example process 400 for restoring preferences stored in a file, in accordance with various aspects of the subject technology. Although the blocks in FIG. 4 are shown in a particular order, other orderings are also possible. For example, some blocks may be performed in different orders or at the same time.

The process 400 may be initiated automatically by an application on the client device 105 (e.g., upon startup of the application, intermittently, or in response to a detected condition) or by a user. At block 405, the application may compare a public file with a private file. Both the public file and the private file may include preferences for using applications in a multi-application environment such as the preferences 200 shown in FIG. 2. The public file can be configured to be accessible to multiple applications on the client device 105 while the private file is configured to be accessible to a single application, the application performing the process 400. The comparing may include determining whether the contents of the public file and the contents of the private file are identical or determining if one or more entries in the private file is different from corresponding entries in the public file.

At block 410, the application may determine whether there has been an unauthorized modification to the preferences of the public file. For example, an unauthorized modification to the preferences stored in the public file may have occurred if the contents of the public file are different from the contents of the private file, if an entry found in the public file is not in the private file (or vice versa), or if an entry in the public file is different from the corresponding entry in the private file. If there is no unauthorized modification, the application can continue operations at block 420.

If the application determines that there is an unauthorized modification, the application can restore the preferences of the public file using the preferences of the private file at block 415 and resume operations at block 420. Restoring the preferences may include, for example, replacing the contents of the public file with the contents of the private file or replacing entries in the public file that are different from their corresponding entries in the private file with the corresponding entries in the private file.

By restoring the preferences in the public file using the preferences of the private file, the application may undo any unauthorized changes made by other applications or malicious code while still allowing the public file to be accessed by other applications running on the client device 105. Furthermore, the private file allows a copy of the preferences that cannot be modified by unauthorized applications or other code.

According to other aspects of the subject technology, an application may encrypt the file containing preferences for using applications in a multiple-application environment. In some implementations, the file may be encrypted using public/private key cryptography scheme in which two separate keys may be used. One key (a private key) may be used to encrypt the content of the file and another key (a public key) may be used to decrypt the content of the file. The private key may be provided to the application authorized to make changes to or otherwise manage the preferences in the file. Using the private key, the application may encrypt the preferences in the file and any subsequent authorized changes to the preferences in the file. The public key may be provided to any other applications or developers of other applications so that those applications can use the public key to decrypt and view the preferences in the file. The decrypted preferences may then be used to determine which application to launch based as described above.

Figure 5:
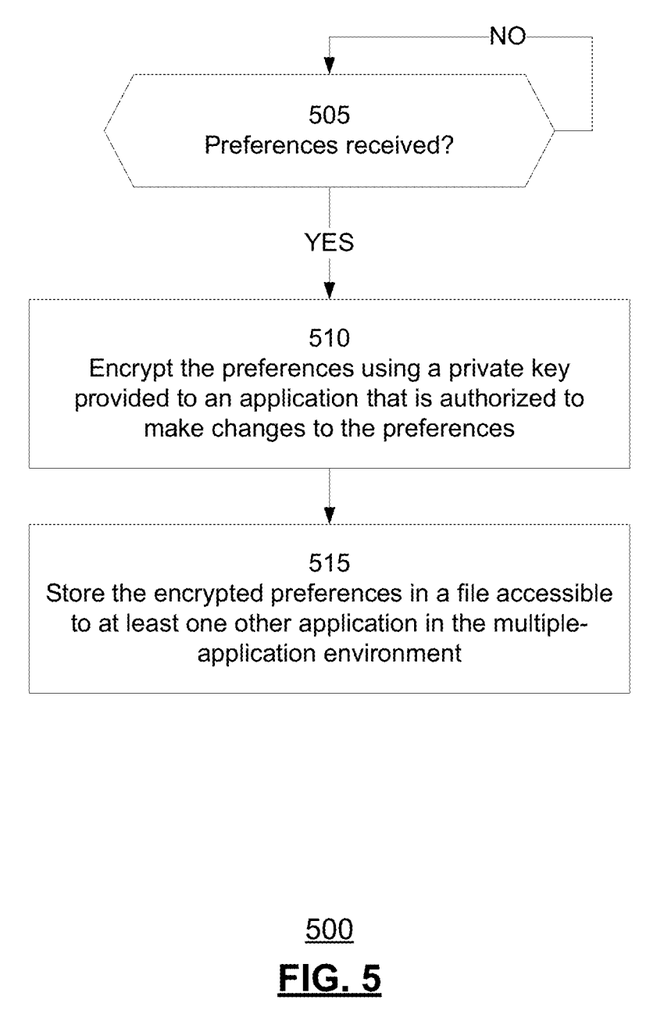
FIG. 5 is a flow chart illustrating an example process for encrypting preferences stored in a file, in accordance with various aspects of the subject technology.

FIG. 5 is a flow chart illustrating an example process 500 for encrypting preferences stored in a file, in accordance with various aspects of the subject technology. Although the blocks in FIG. 5 are shown in a particular order, other orderings are also possible. For example, some blocks may be performed in different orders or at the same time.

At block 505, an application authorized to make changes to preferences for using applications in a multi-application environment may determine whether new or changed preferences have been received from a user or from another source. If no preferences have been received, the application may continue to wait for preferences. Once the preferences are received, the application encrypts the preferences using a private key provided to the authorized application at block 510. The encrypted preferences may then be stored in a file accessible to at least one other application in the multiple-application environment at block 515.

Once the encrypted references have been stored in the file, the other applications may then access the file and decrypt the encrypted preferences using a public key corresponding to the private key. The preferences can then be used by the other applications to determine which applications to launch under a particular set of circumstances or conditions.

Although various aspects of the subject technology have been described with respect to preferences for using applications and the conditions in which applications are used, other types of preferences may also be used and stored in the files. For example, volume settings for certain conditions or other settings that may be used by multiple applications may also be stored.

Figure 6:
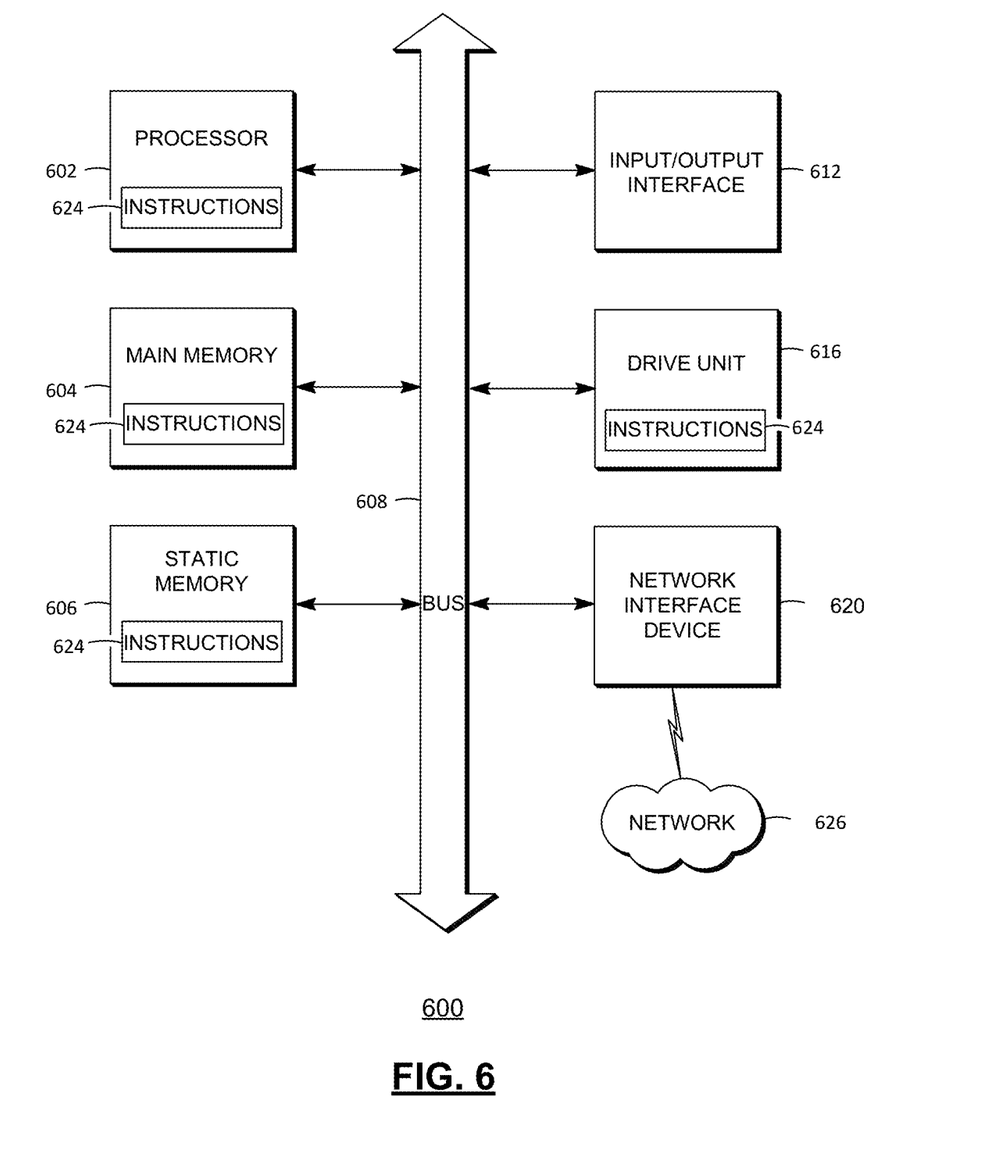
FIG. 6 is a block diagram illustrating an example computer system with which any of the computing machines, devices, or systems discussed herein may be implemented, in accordance with some aspects of the subject technology.

FIG. 6 is a block diagram illustrating an example computer system with which any of the computing machines, devices, or systems discussed herein may be implemented, in accordance with some aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for restoring preferences stored in a file, the method comprising:
   comparing a public file comprising preferences for using applications in a multiple-application environment with a private file comprising preferences for using applications in the multiple-application environment, wherein the preferences for using applications in the public file specify at least one application to launch and a set of conditions in which the at least one application is launched, wherein the public file is accessible to a plurality of applications in the multiple-application environment, and wherein the private file is accessible to a single application in the multiple-application environment;
   determining whether there is an unauthorized modification to the preferences of the public file based on the comparing; and
   restoring, if there is an unauthorized modification, the preferences of the public file using the preferences of the private file,
   wherein the single application is configured to initiate the comparing, the determining, and the restoring in response to the single application starting up.

2. The computer-implemented method of claim 1, wherein the preferences for using applications are stored in the public file as a plurality of entries, and wherein the public file is configured to be used by the plurality of applications to select an application to launch based on a given set of conditions.

3. The computer-implemented method of claim 1, wherein the single application is a web browser.

4. The computer-implemented method of claim 1, wherein the single application is configured to perform the comparing, the determining, and the restoring.

5. The computer-implemented method of claim 4, wherein the comparing, the determining, and the restoring are performed in response to the single application starting up.

6. The computer-implemented method of claim 1, wherein the public file and the private file are separate from an operating system file comprising preferences for using applications.

7. The computer-implemented method of claim 1, further comprising:
receiving preferences for using applications;
storing the preferences in the public file; and
storing the preferences in the private file.

8. The computer-implemented method of claim 1, wherein the determining of whether there is the unauthorized modification comprises determining at least one entry in the private file is different from a corresponding entry in the public file.

9. The computer-implemented method of claim 8, wherein the restoring of the preferences comprises replacing the corresponding entry in the public file with the at least one entry in the private file.

10. A system for restoring preferences stored in a file, the system comprising:
one or more processors; and
a non-transitory machine-readable medium comprising instructions stored therein, which when executed by the one or more processors, cause the one or more processors to perform operations comprising:
comparing a public file comprising preferences for using applications in a multiple-application environment with a private file comprising preferences for using applications in the multiple-application environment, wherein the preferences for using applications specify at least one application to be launched and a set of conditions in which the at least one application is to be launched, wherein the public file is accessible to a plurality of applications in the multiple-application environment, and wherein the private file is accessible to a single application in the multiple-application environment;
determining whether there is an unauthorized modification of the preferences stored in the public file based on the comparing; and
undoing, if there is an unauthorized modification, the unauthorized modification of the preferences stored in the public file using the preferences of the private file,
wherein the single application is configured to initiate the comparing, the determining, and the undoing in response to the single application starting up.

11. The system of claim 10, wherein the preferences for using applications comprise settings configured to be used by the plurality of applications.

12. The system of claim 10, wherein the single application is a web browser configured to perform the comparing, the determining, and the restoring.

13. The system of claim 10, wherein the public file and the private file are separate from an operating system file comprising preferences for using applications.

* * * * *